United States Patent [19]

Maxon, Jr. et al.

[11] 3,711,915
[45] Jan. 23, 1973

[54] METHOD OF MAKING TOOTHED RACKS

[76] Inventors: Glenway Maxon, Jr.; William H. B. Wright, III, both of 3129 West Mill Road, Milwaukee, Wis. 53209

[22] Filed: Aug. 5, 1971

[21] Appl. No.: 169,221

Related U.S. Application Data

[62] Division of Ser. No. 17,126, March 6, 1970.

[52] U.S. Cl. .....................29/159.2, 29/412, 74/422
[51] Int. Cl. ........B21d 53/28, B21h 5/00, B21k 1/30, B23p 15/14, B29d 15/00
[58] Field of Search .........29/159.2, 159 R, 412, 415, 29/416; 266/23 K, 23 E, 23 R; 74/422, 30, 89.11, 29; 90/1, 2; 148/9

[56] References Cited

UNITED STATES PATENTS

| 1,308,160 | 7/1919 | Brinton | 29/159.2 |
|---|---|---|---|
| 1,520,625 | 12/1924 | Wigley | 29/159.2 |
| 2,432,161 | 12/1947 | Johnston | 266/23 K X |
| 3,306,597 | 2/1967 | Maxon, Jr. et al. | 266/23 K |

FOREIGN PATENTS OR APPLICATIONS 257,938  1/1927  Great Britain .....................29/159.2

Primary Examiner—Charles W. Lanham
Assistant Examiner—Victor A. DiPalma
Attorney—Ira Milton Jones

[57] ABSTRACT

The flame of a cutting torch is passed through a central longitudinal zone of an elongated blank so that the kerf forms two rack sections with substantially identical teeth thereon. Rack sections with such flame cut teeth are secured together in side-by-side relationship, with their teeth in endwise register, to form a rack exceeding the thickness of the blanks from which the rack sections are cut. Before flame cutting of the teeth is commenced, thin slices are flame cut from opposite faces of the blank which are to become the backs of the rack sections, to prevent warping of the flame cut rack sections along their lengths.

9 Claims, 5 Drawing Figures

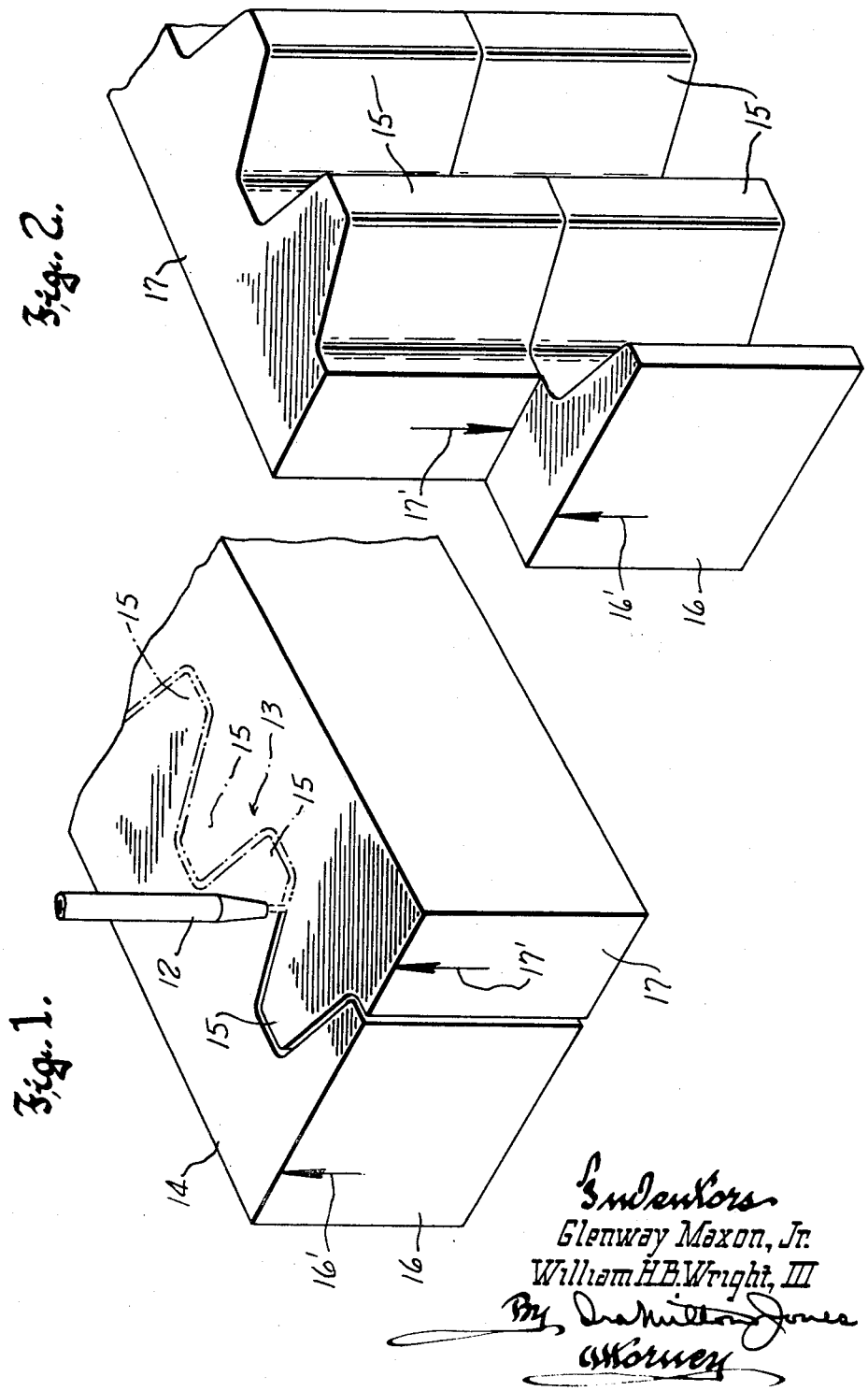

PATENTED JAN 23 1973
3,711,915
SHEET 2 OF 2
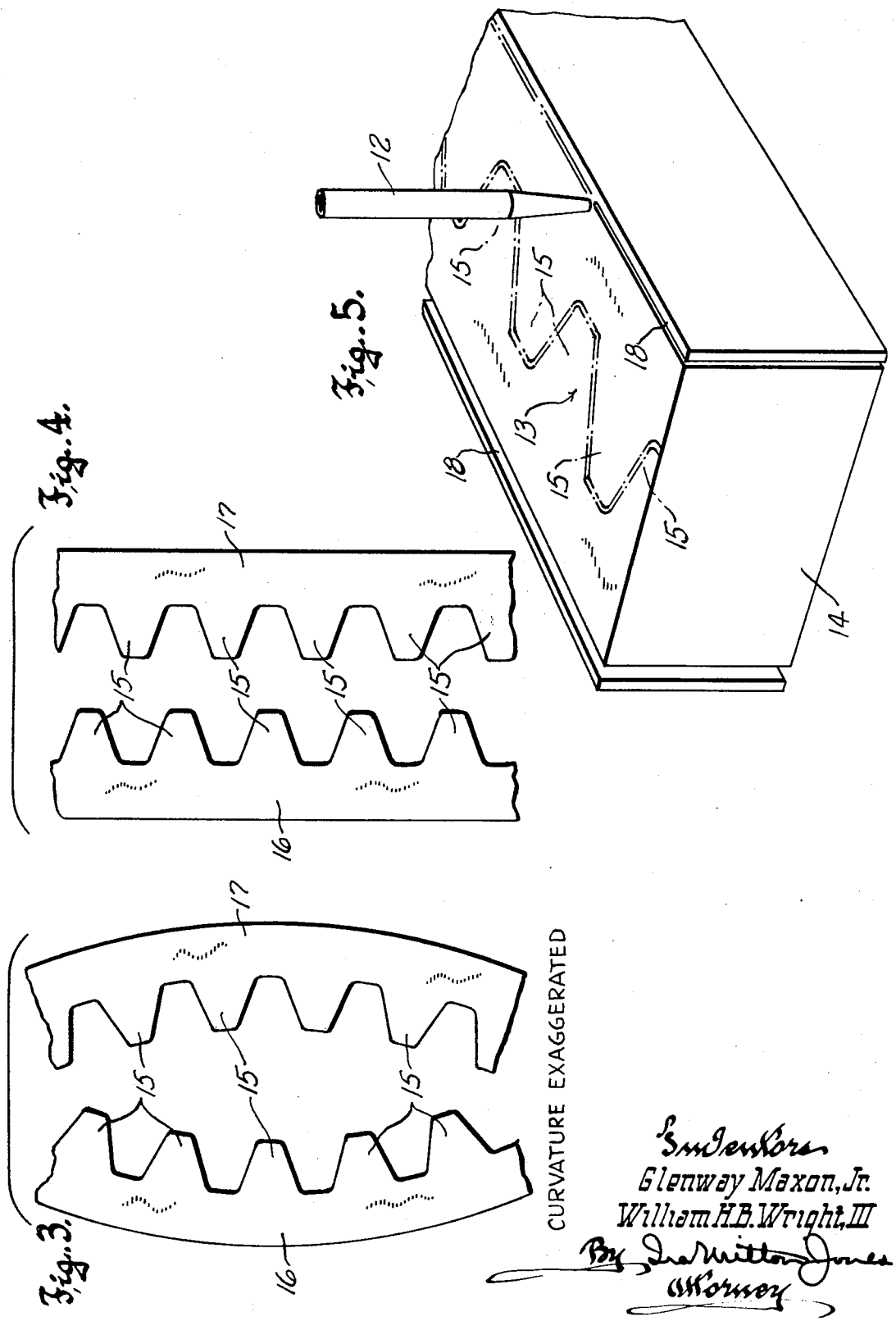
Glenway Maxon, Jr.
William H.B. Wright, III

METHOD OF MAKING TOOTHED RACKS

This application is a division of our copending application, Ser. No. 17,126, filed Mar. 6, 1970.

Like our application Ser. No. 843,725, filed July 22, 1969 now abandoned, of which said application, Ser. No. 17,126, is a continuation-in-part, this invention relates to an improved method of making racks.

In a more specific sense, this invention is concerned with the flame cutting of racks having substantial face width and large size teeth, while achieving an accuracy that was hitherto unheard of.

It is generally recognized that large size racks can be flame cut at far less cost than is entailed when the conventional casting and machining practices are resorted to. However, because the attainment of a substantial degree of accuracy in the flame cutting of teeth in blanks of the thickness required for racks of substantial face width was heretofore considered impossible, that technique was employed only when accuracy of the rack teeth, both as to profile and pitch, was not a prerequisite.

It has now been discovered that two of the main reasons for the above mentioned deficiency of the flame cutting technique were distortion of the flame of the torch, especially when cutting the tooth tips and roots, and thermal expansion of the blank during the flame cutting operation.

The blank will expand to an extent depending upon the increase in the temperature of the metal adjoining the cut therein; and bearing in mind that the velocity of cutting must be decreased and the diameter of the torch flame must be increased to cut through the thicker blanks, the temperature of the metal will rise as a function of the thickness of the blanks being cut.

Consequently, excessive heat is generated in the interiors of substantially thick blanks during flame cutting of teeth therein, which heat cannot be dissipated sufficiently to enable thermal expansion to be controlled, even though quenching is resorted to by directing jets of cooling water onto the flame cut areas as soon as possible after they have been acted upon by the torch.

With the above in mind, it is an object of this invention to provide a method of making racks of any desired face width from laminations comprised of substantially identical rack sections, matching pairs of which can be simultaneously flame cut from single blanks having a thickness less than the finished rack, and thin enough to enable thermal expansion thereof to be readily controlled and to minimize deviation of tooth profile due to flame distortion.

Another object of the invention is to provide a method of making racks according to the manner described in the preceding object, which method substantially eliminates lengthwise warping of the flame cut rack sections.

With these objects in mind, the invention resides in the novel method substantially as hereinafter described and more particularly defined by the appended claims. This disclosure, however, is intended merely to exemplify the invention, the nature of which is defined by the appended claims.

The accompanying drawings illustrate one complete example of the method according to the best mode so far devised for practical application of the principles thereof, and in which:

FIGS. 1 and 2 are fragmentary perspective views illustrating how racks are made in accordance with this invention;

FIG. 3 is a more or less diagrammatic plan view of a pair of matching rack sections illustrating in somewhat exaggerated form how the sections tend to warp along their length;

FIG. 4 is a view similar to FIG. 3, showing how straight rack sections can be cut in accordance with the method of this invention; and FIG. 5 is a perspective view illustrating that thin slices of the blank are cut from opposite longitudinal edges thereof before flame cutting of the rack teeth is commenced, to assure against warping of the sections.

Referring now to the accompanying drawings, FIGS. 1 and 2 disclose how racks, with a simple form of tooth, can be flame cut in accordance with the method of this invention, from blanks having a rectangular cross section. As best seen in FIG. 1, the flame of a cutting torch 12 is directed downwardly through a central longitudinal zone 13 of the blank 14, to produce a kerf that is preferably but not necessarily parallel to the opposite narrow sides of the blank and defines equispaced teeth 15 therein with the teeth extending in a row lengthwise of the blank. With respect to the rectangular cross section of the blank, the flame of the torch is passed through the thickness of the blank, from one wide side of the rectangle to the other.

The teeth 15 are cut so as to be identical to one another, with straight sides, tips and roots. Accurate cutting of the teeth depends to a large degree on the care with which relative motion between the torch and the blank is effected, and it should be carried out in a way that assures that the speed of the torch relative to the surface of the blank being cut is such as to maintain a smooth, uniform kerf.

The cutting of rack teeth in the central longitudinal zone of the blank produces two rack sections 16 and 17, with identical meshing teeth 15 thereon. Flame cutting is preferably commenced at one end of the blank in a way to define one-half a tooth 15 on said end of one rack section 16, and one-half a tooth space on the laterally adjacent rack section 17, as seen in FIG. 1; and with the blank free to expand lengthwise toward said one end as it is heated by the torch but held against thermal expansion in the opposite direction. The aforesaid copending application, Ser. No. 17,126, which discloses a machine for flame cutting racks, can be consulted for a disclosure of one means of confining the blank against thermal expansion in the direction toward its end opposite the one at which the cut is started.

It is also advantageous, though not essential, to effect flame cutting through a longitudinal zone of the blank which is at its exact center, so that flame cutting takes place at an average equal distance from the opposite longitudinal edges of the blank. With reference to the rectangular cross section of the blank, flame cutting is performed along a longitudinal zone of the blank midway between the ends of the rectangle. Such flame cutting will produce two rack sections which are identical except that their teeth are offset from one another a distance equal to one-half of the spacing or pitch of the rack teeth.

After the torch has cut teeth in the blank along its entire length, the two rack sections 16 and 17 are separated and laid one against the other as seen in FIG. 2, with the sections so oriented that all of their teeth face in the same direction, and one section is offset lengthwise from the other by one-half of a tooth space so as to dispose the teeth of the two sections in exact endwise register. Preferably the rack section 17 is disposed with the first full tooth 15 cut thereon in endwise register with the first full tooth cut on the section 16, and with those sides of the sections that correspond to the face of the blank at which the flame of the torch entered it in mating engagement with one another. The face of the blank referred to is uppermost in FIG. 1, in which arrows 16' and 17' on the two rack sections designate the flame-entering face of the blank. The arrows 16' and 17' in FIG. 2 show how the blank section 17 was turned up and over the rack section 16, and then disposed with its teeth in register with those on the latter section.

After the rack sections 16 and 17 are laid one against the other and oriented as seen in FIG. 2, they can be secured together in any desired way — as for instance by bolts, welding or even by an epoxy bonding agent. Usually, any frictional teeth on the ends of the rack sections are cut off to leave both ends of the sections flush with one another and similar in appearance to the end of section 17 seen in FIG. 2.

One of the main features of the method described, is that the securement of the two rack sections 16 and 17 together with their teeth in endwise register produces a rack having a width equal to twice the thickness of the blank from which the rack was cut.

From the above it will also be apparent that if the proper care is exercised during the flame cutting operation, no machining, other than descaling and deburring, should be necessary on the flanks or tips of the rack teeth; and a number of rack units laminated in the manner described can be secured to a supporting surface in end to end relation to provide a rack of any desired length and at far less cost that would be entailed if more conventional machining operations had been employed.

The act of flame cutting of the matching rack sections may have a tendency to produce lengthwise warping thereof, as seen in exaggerated form in FIG. 3. Such lengthwise warping causes the toothed edges of the sections to assume a concave curvature while the backs of the sections take on a convex curvature.

Lengthwise warping of the rack sections can be controlled and substantially completely eliminated in accordance with this invention by a flame cutting operation performed on the blank before the teeth are flame cut therein, and which involves cutting off thin slices from those faces of the blank which are to become the backs of the rack sections. FIG. 5 shows one such slice 18 which has already been flame cut from one face of the blank, with the torch in the act of cutting a similar slice 18 from the opposite face of the blank. Obviously, both cuts can be made simultaneously. The outlines of the rack teeth 15 to be thereafter cut in the portion of the blank medially between said faces thereof are shown in construction lines.

We are unable to explain exactly why the flame cutting of thin slices from opposite sides of the blank in the manner described above minimizes lengthwise warping of the matching rack sections.

It should be apparent that racks can be flame cut with teeth having rounded tips and gullets of corresponding concavity at the roots of the teeth, for greater strength; and that the teeth may have cycloidal or straight flanks and faces that are either symmetrical or non-symmetrical. With any non-symmetrical tooth form, however, the racks should be flame cut so that the sections from which they are laminated can be oriented in one way or another to bring their teeth into the end to end matching or congruent relationship in which they complement one another to severally or collectively provide the teeth of the finished rack.

Persons skilled in the art will also appreciate that the above described method also makes possible the production of flame cut racks having a face width greater than twice the thickness of the blank from which the racks are cut. This of course will require the cutting of the same style and size of teeth in each of two or more blanks, one blank at a time.

There may also be times when it may be necessary to desirable to effect flame cutting along one marginal edge portion of a blank. At such times, the narrow piece is discarded, and the wider piece provides a rack section that can be welded or secured to others like it, with its teeth in endwise register and congruent therewith, to produce a rack of the desired width.

From the foregoing description, together with the accompanying drawings, it will be apparent to those skilled in the art that this invention provides a novel method of making racks by which the teeth of the racks can be flame cut.

Those skilled in the art will also appreciate that the invention can be embodied in forms other than as herein disclosed for purposes of illustration.

The invention is defined by the following claims:

1. The method of making a rack, which is characterized by the steps of:
    A. cutting through an elongated blank of rectangular cross section to produce a kerf which extends from one wide side of the blank to the other along its length and defines two laterally adjacent rack sections with equispaced meshing teeth thereon that are substantially identical in shape and size;
    B. laying one rack section against the other in such orientation that the teeth on the two sections project in the same direction, and a number of teeth on one section are in exact register with teeth on the other section;
    C. and securing the sections together in said orientation to form a single rack having a width equal to twice the thickness of the blank from which the sections were cut.

2. The method of making a rack according to claim 1, wherein said one section when layed against the other is displaced lengthwise of its original position a distance equal to one-half the spacing of its teeth.

3. The method of making a rack according to claim 1, wherein prior to the cutting of teeth in the blank, thin slices are flame cut from the narrow longitudinal side edges of the blank.

4. The method of making a rack according to claim 1, wherein:
    A. the teeth are cut by a flame passing through the blank from one wide side thereof, as a consequence of relative movement between the flame and the blank;

B. and said one section is layed against the other with the faces of the sections corresponding to said one wide side of the blank in contact with one another.

5. The method of making a rack according to claim 4, wherein said one section when layed against the other is displaced lengthwise of its original position a distance equal to one-half of the spacing of its teeth.

6. The method of making a rack according to claim 5, wherein the flame cutting of teeth in the blank is preceded by a flame cutting operation in which thin slices are cut from the narrow longitudinal edges of the blank.

7. The method of making a rack according to claim 5, wherein:
A. flame cutting of the teeth is commenced at one end of the blank and relative motion between the blank and the flame advances the later toward the other end of the blank;
B. and the blank is free to expand lengthwise toward said one end thereof as it is heated by the flame, while being restrained against thermal expansion in the opposite direction.

8. The method of making a rack according to claim 1, wherein:
A. the teeth are cut by a flame as a consequency of relative movement between the flame and the blank;
B. flame cutting is commenced at one end of the blank and relative movement between the blank and the flame advances the latter toward the other end of the blank;
C. and the blank is free to expand lengthwise toward said one end thereof as it is heated by the flame, while being restrained against thermal expansion in the opposite direction.

9. The method of making a rack according to claim 8, wherein the flame is passed through the central zone of the blank at an equal average distance from the opposite longitudinal narrow edges of the blank.

* * * * *